US010877659B2

(12) United States Patent
Helfman

(10) Patent No.: US 10,877,659 B2
(45) Date of Patent: Dec. 29, 2020

(54) METHOD FOR CONTROLLING THE MAGNIFICATION LEVEL ON A DISPLAY

(71) Applicant: Keysight Technologies, Inc., Santa Rosa, CA (US)

(72) Inventor: Jonathan Helfman, Santa Clara, CA (US)

(73) Assignee: Keysight Technologies, Inc., Santa Rosa, CA (US)

( * ) Notice: Subject to any disclaimer, the term of this patent is extended or adjusted under 35 U.S.C. 154(b) by 0 days.

(21) Appl. No.: 16/049,656

(22) Filed: Jul. 30, 2018

(65) Prior Publication Data

US 2018/0335923 A1 Nov. 22, 2018

Related U.S. Application Data

(63) Continuation of application No. 14/056,845, filed on Oct. 17, 2013, now Pat. No. 10,042,544.

(60) Provisional application No. 61/746,472, filed on Dec. 27, 2012.

(51) Int. Cl.
*G06F 3/0488* (2013.01)
*G06F 3/01* (2006.01)

(52) U.S. Cl.
CPC ............ *G06F 3/0488* (2013.01); *G06F 3/017* (2013.01)

(58) Field of Classification Search
CPC ................................ G06F 3/017; G06F 3/0488
See application file for complete search history.

(56) References Cited

U.S. PATENT DOCUMENTS

| 7,844,915 B2 | 11/2010 | Platzer |
| 8,077,153 B2 | 12/2011 | Benko |
| 8,468,469 B1 * | 6/2013 | Mendis ............... G06F 3/0484 715/863 |
| 2005/0188333 A1 | 8/2005 | Hunleth |
| 2006/0001650 A1 | 1/2006 | Robbins |
| 2006/0022955 A1 | 2/2006 | Kennedy |

(Continued)

FOREIGN PATENT DOCUMENTS

| CN | 102428655 A | 4/2012 |
| CN | 102474560 A | 5/2012 |
| WO | 2010/131869 A2 | 11/2010 |
| WO | 2011/007264 A1 | 1/2011 |

OTHER PUBLICATIONS

China Patent Application No. 201310516356.6, office action dated Sep. 28, 2017. No translation available.

(Continued)

*Primary Examiner* — Ryan Barrett

(57) ABSTRACT

A method for controlling a screen in a data processing system to generate displays that include portions of an underlying scene is disclosed. The method includes displaying on the screen a first displayed scene, detecting a long touch gesture, and displaying a second scene on the screen. The first displayed scene is characterized by a first magnification and a first offset relative to the underlying scene. The second displayed scene includes a different portion of the underlying scene and is characterized by a second magnification that is different from the first magnification. In one aspect of the invention, the second displayed scene is characterized by a second offset that is determined by the long touch gesture, and the second offset depends on the first displayed scene and the long touch gesture.

16 Claims, 5 Drawing Sheets

(56) References Cited

U.S. PATENT DOCUMENTS

| | | | |
|---|---|---|---|
| 2007/0257891 A1 | 11/2007 | Esenther | |
| 2008/0122796 A1 | 5/2008 | Jobs | |
| 2008/0158191 A1 | 7/2008 | Yang | |
| 2009/0183930 A1 | 7/2009 | Yang | |
| 2010/0020025 A1 | 1/2010 | Lemort | |
| 2010/0299641 A1 | 11/2010 | Cundill | |
| 2010/0302281 A1 | 12/2010 | Kim | |
| 2011/0013049 A1 | 1/2011 | Thorn | |
| 2011/0029917 A1 | 2/2011 | Um | |
| 2012/0081317 A1 | 4/2012 | Sirpal | |
| 2012/0223891 A1 | 9/2012 | Patterson | |
| 2012/0254808 A1 | 10/2012 | Gilfind | |
| 2012/0280087 A1 | 11/2012 | Coffman | |
| 2013/0076908 A1* | 3/2013 | Bratton | H04N 5/23293 348/159 |
| 2014/0028578 A1 | 1/2014 | Dinh | |
| 2014/0059457 A1* | 2/2014 | Min | G06F 3/0484 715/764 |
| 2014/0125600 A1 | 5/2014 | Meng | |

OTHER PUBLICATIONS

China Patent Application No. 201310516356.6, office action dated Mar. 6, 2018. No translation available.

Lee, et al., Vision-Based Remote Control System by Motion Detection and Open Finger Counting, Consumer Electronics, IEEE Transactions, vol. 55, No. 4, pp. 2308-2313, Nov. 2009.

Lu, et al., Gesture Coder: A Tool for Programming Multi-Touch Gestures by Demonstration, CHI 2012, Austin, Texas, USA, May 5-10, 2012.

Non-final Office Action dated Jan. 6, 2017, U.S. Appl. No. 14/056,845.

Final Office Action dated Aug. 11, 2017, U.S. Appl. No. 14/056,845.

Non-final Office Action dated Jul. 17, 2015, U.S. Appl. No. 14/056,845.

Final Office Action dated Feb. 16, 2016, U.S. Appl. No. 14/056,845.

Notice of Allowance dated Jan. 28, 2019, China Application No. 201310516356.6.

China Office Action dated Aug. 30, 2018, Application No. 201310516356.6.

* cited by examiner

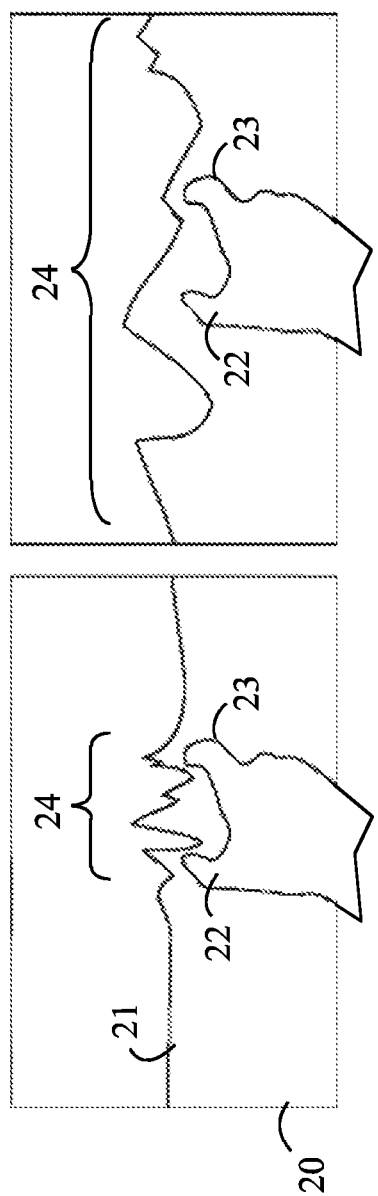

METHOD FOR CONTROLLING THE MAGNIFICATION LEVEL ON A DISPLAY

CROSS-REFERENCE TO RELATED PATENT APPLICATIONS

This application is a continuation of co-pending U.S. patent application Ser. No. 14/056,845, filed on Oct. 17, 2013, now issued as U.S. Pat. No. 10/042,544 on Aug. 7, 2018, which was a conversion of, and claims priority therefrom, of U.S. Provisional Patent Application 61/746,472 filed on Dec. 27, 2012, said patent applications being incorporated by reference herein.

BACKGROUND

Many measurement instruments measure and display data in a computer controlled display. In many cases, the instrument generates more data than can be viewed effectively in a single view. Hence, such instruments must provide some mechanism for allowing the user to control the display such that a desired sub-set of the data is displayed at any given time. Many measurement-related tasks can be supported by a system that provides a high-level overview of the collected data and mechanisms to allow the user to zoom in on an area of interest in the data.

In the simplest case, a user identifies an area of interest in the overview and then zooms in to view the interesting data in more detail. For example, the area of interest could be an anomaly or pattern that is visible in the overview with sufficient detail to be recognized as interesting but with insufficient detail to be identified or measured precisely. In this case, a user often manipulates a control to change the current display settings to concentrate the available display resolution on the area of interest by zooming in on the area of interest. Such viewing techniques are typically used in the context of visual inspection of electronic waveforms when identifying anomalies (e.g., a spurious signal).

Modern instruments utilize controls in which the conventional hardware controls such as knobs on an instrument panel are replaced by display screens on computers. The display screens may be directly connected to the measuring hardware or be located remotely on mobile devices connected to the measuring hardware over a network. The remote user interfaces do not typically have hardware knobs for controlling the displays. In displays that are equipped with multi-touch displays, "gestures" are used for controlling many display attributes such as the level of zoom.

For example, "pinch-zoom" is now used on many oscilloscopes and network analyzers to control the zoom level of the display. In a pinch zoom-in gesture, the user places two fingers on the display in the region to be zoomed and then moves the fingers apart while remaining in contact with the display.

When the fingers are together in these gestures, the screen area under the fingers is obscured making control of the gesture difficult. In the case of a zoom-out gesture, the user moves the user's fingers together. In the case of the zoom-in gesture, the fingers obscure the area of interest making the precise area to be viewed in the new display difficult to define. In the case of a zoom-out gesture, the gesture ends with the fingers together making it difficult to guide the zoom.

Gestures that rely on finger movements can lead to problems caused by spurious touches when releasing the gesture. In addition, if a large zoom factor is required, the pinch zoom must be repeated several times to arrive at the desired level of detail.

SUMMARY

The present invention includes a method for controlling a screen in a data processing system to generate displays that include portions of an underlying scene. The method includes displaying on the screen a first displayed scene, detecting a long touch gesture, and displaying a second scene on the screen. The first displayed scene is characterized by a first magnification and a first offset relative to the underlying scene. The second displayed scene includes a different portion of the underlying scene and is characterized by a second magnification that is different from the first magnification. In one aspect of the invention, the second displayed scene is characterized by a second offset that is determined by the long touch gesture, and the second offset depends on the first displayed scene and the long touch gesture.

In another aspect of the invention, the long touch gesture is characterized by first and second locations separated by a distance on the screen at which a user touches the screen and wherein the second magnification is greater than the first magnification if the distance is greater than a first distance. The second magnification is less than the first magnification if the distance is less than a first distance.

In a still further aspect of the invention, a third scene is displayed after a second time period if the long touch is maintained for that second time period. The third scene includes a different portion of the underlying scene and is characterized by a third magnification and a third offset. The second time period can be less than the first time period.

In another aspect of the invention, the first displayed scene is displayed when the long touch gesture is terminated. In another aspect, the screen continues to display the second screen when the long touch gesture is terminated.

BRIEF DESCRIPTION OF THE DRAWINGS

FIGS. 1A and 1B illustrate a display screen that utilizes one embodiment of a zoom method according to the present invention.

DETAILED DESCRIPTION

Figure 5:
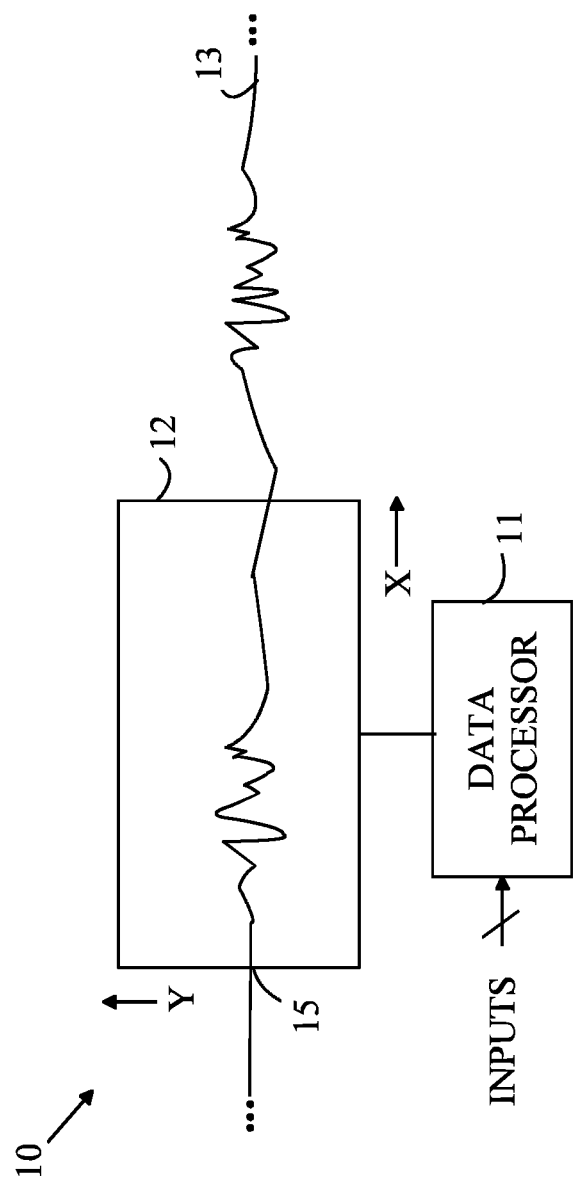
FIG. 5 illustrates a typical measurement instrument that executes the display control method of the present invention.

Refer now to FIG. 5, which illustrates a typical measurement instrument that executes the display control method of the present invention. Instrument 10 typically includes a data processor 11 that receives signals from a system that is being measured. Data processor 11 converts these measurements to a data set 13 that is stored in data processor 11. Instrument 10 also includes a display screen 12 that is used to display the data set. However, display screen 12 is typically limited in resolution and size, and hence, for many data sets of interest, the entire data set cannot be displayed on display screen 12 with sufficient resolution to allow the user to see the required detail. In general, the display screen has a finite resolution measured in pixels in the X and Y directions. The number of pixels in the X-direction is often less than the number of points in the data set, and hence, the individual points of the entire dataset cannot be displayed within the window.

Accordingly, data processor 11 implements a display mode in which display screen 12 simulates a window through which the data set can be viewed. The window is characterized by an offset 15 which defines the first entry in the data set that is visible in the window and a magnification that determines the last entry in the data set that is visible in the window. As the magnification is increased, the number of points within the window decreases and the distance between the points increases. A "zoom-in" operation refers to an operation in which the magnification is increased, and hence, the finer details of the portion of the data set seen through the window are visible. However, the size of the viewed portion of the data set is decreased. Similarly, a "zoom-out" operation refers to an operation in which the magnification is decreased allowing the user to see more of the data set in the window at the expense of losing the fine details.

The manner in which the present invention provides its advantages can be more easily understood with reference to FIGS. 1A and 1B, which illustrate a display screen that utilizes one embodiment of a zoom method according to the present invention. In general, the display screen can be viewed as a window into a larger data set or "scene" characterized by an X-Y coordinate system. For the purposes of the present discussion, the X-axis is assumed to be the horizontal axis. The portion of the scene that is shown in the window is determined by the location of the center of the window in the data set and the magnification value associated with the window. A zoom-in operation corresponds to increasing the magnification associated with the window. A zoom-out operation corresponds to decreasing the magnification associated with the window. It should be noted that the magnification can have different values in the X and Y directions. For example, a zoom-in operation could be defined to only increase the magnification in the X-direction. To simplify the following discussion, it will be assumed that the zoom-in and zoom-out operations only change the X-axis magnification.

Referring to FIG. 1A, the display 20 shows a trace 21 having a portion 24 that a user wishes to view in greater detail. The user brackets the area of interest with the user's fingers as shown at 22 and 23. The user holds this double-touch gesture for a time sufficient for the data processing system that operates the display to detect a "long touch" gesture or event. Upon detecting such a long touch event, the data processing system zooms in on the indicated area as shown in FIG. 1B.

For the purposes of this discussion, a "long touch" event or gesture is defined to be a simultaneous touching of the display screen at two separated locations that is maintained with the locations remaining fixed for a period of time that is greater than a predetermined period of time. The predetermined period of time is chosen such that the long touch event is distinguishable from the beginning of another gesture in which the user simultaneously touches the screen at two locations and then moves the user's fingers together or apart on the screen. A pinch zoom is an example of a gesture that starts with such a simultaneous touching and which must be distinguished from a long touch.

The offset of the new view is determined by the position of the user's fingers in the original view. In one aspect of the invention, the new view is zoomed such that the screen displays the area between the two touch points. However, other methods for determining the center of the new display could be utilized. For example, the new display could be centered at a location determined by the touch points but the magnification level could be set by a system parameter, i.e., the zoom magnification is a predetermined factor greater than the magnification in the previous display.

In one aspect of the invention, a mode is actuated in which the system continues to zoom if the user maintains the long touch gesture after the data processing system has zoomed in on the indicated region in response to the long touch gesture. In this case, there is a predetermined time period defined such that the system executes a zoom in on the indicated region each time that time interval has passed. This allows the user to increase the magnification beyond that available in a single zoom in response to a single long touch gesture. The choice of zoom-in mode may be set by the user by selecting the mode from a menu associated with zoom commands.

The time period that must elapse before the subsequent zoom operations take place can be different from the time period that defines the long touch that initiated the first zoom. In one aspect of the invention, the second time period is shorter than the first time period. If the user continues the long touch past the second zoom, the third time period that must pass before a third zoom can be still shorter. In a sequence of zooms, the time period defining the long touch can decrease from the time period that defines the first long touch to some predetermined minimum time period. In the limit, the system continuously zooms in or out at some predetermined rate as long as the user maintains the touch for longer than a predetermined time period.

Similarly, there are multiple modes for responding to the cessation of the long touch gesture. In one mode, the data processing system responds to the user breaking the long touch gesture by zooming back to the original magnification. This mode of operation is useful when the user wishes to pan along the signal at one magnification and occasionally zoom in on an area to better classify the signal in the area of interest, and then zoom back to continue panning at the original magnification. If the long touch gesture has been maintained for a sufficient period of time to actuate multiple zoom-in commands, the magnification can either be set to return to the magnification before the long touch was initiated or to the magnification at the previous level of magnification. In another mode, the data processing system responds to the user breaking the long touch gesture by leaving the magnification at the current value.

In one aspect of the invention, the user can pan along the trace while maintaining the long touch gesture. In the mode in which the system continues to zoom as long as the user maintains the long touch gesture, this panning operation allows the user to re-center the display during the multiple zoom operation.

Figure 2A:
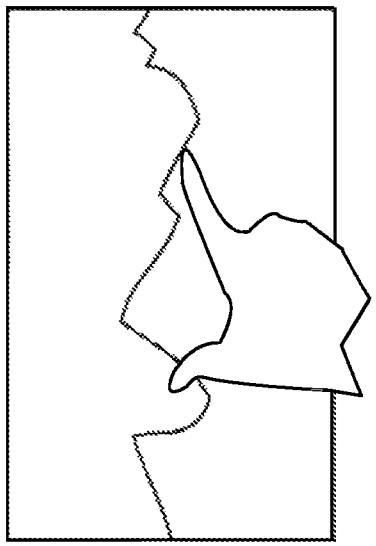
FIGS. 2A and 2B illustrate a zoom-out operation according to one embodiment of the present invention.
Figure 2B:
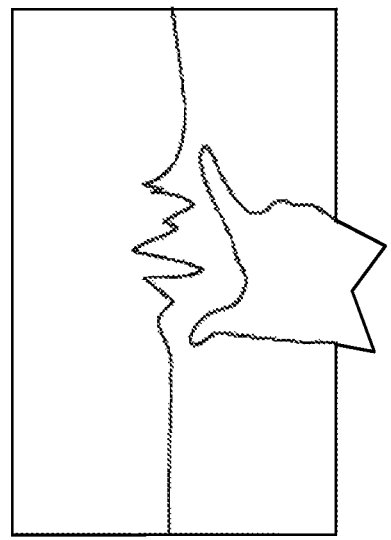

A long touch gesture can also be used for decreasing the magnification of the display, i.e., zooming out. In one aspect of the invention, analogous modes of operation are available when zooming out. Refer now to FIGS. 2A and 2B, which illustrate a zoom-out operation according to one embodiment of the present invention. To implement a zoom-out operation, the user executes a long touch gesture with the user's fingers widely spaced apart as shown in FIG. 2A. If the user maintains this gesture for more than a predetermined period of time, the system zooms out as shown in FIG. 2B.

In one aspect of the invention, if the user continues the long touch gesture past the period of time in which the first zoom-out operation is initiated, the system will continue to zoom out at the end of each successive time period. When the user breaks the long touch operation, the system can either leave the magnification at the current value or return to one of the previous magnification levels.

In one aspect of the invention, a zoom-out operation is distinguished from a zoom-in operation by the distance between the user's touch points in the long touch gesture. In one mode, if the distance is greater than some predetermined distance, the system assumes that the user is executing a zoom-out command. Similarly, if the distance is less than the predetermined distance, the system assumes that the user is executing a zoom-in command. In another mode, this distance is set by the user in a first zoom-in command. The first operation is assumed to be a zoom-in operation when the user executes the long touch. This distance defines the distance used to determine if a subsequent long touch operation is a zoom out or a zoom in. When the user changes the distance between the touch points by more than some predetermined factor relative to the previous distance, the system assumes that the user is now signaling a zoom-out operation. Similarly, when the user moves the touch points back to a distance that is within some second factor times the original distance, the system assumes that the user is now performing a zoom-in operation again.

Figure 3B:
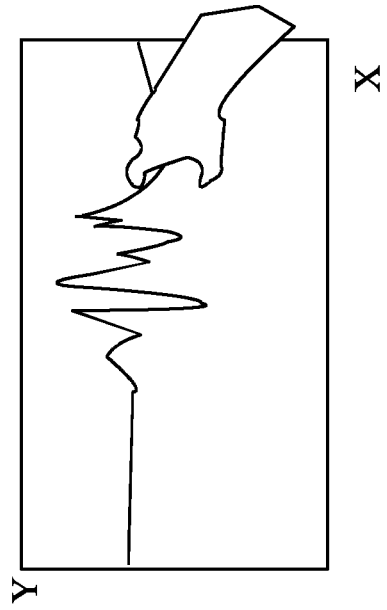
FIGS. 3A and 3B illustrate a vertical zoom-in operation.
Figure 3A:
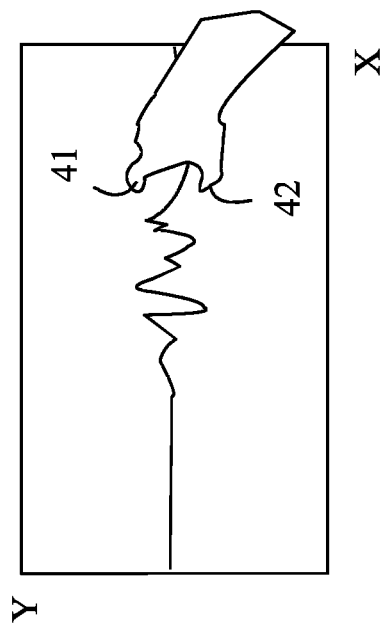

The above embodiments assume that the zoom-in and zoom-out operations only operate on the X-axis magnification. However, a similar set of zoom-in and zoom-out operations could be implemented in the Y-direction by rotating the touch points so that the touch points are now vertically aligned. Refer now to FIGS. 3A and 3B, which illustrate a vertical zoom-in operation. The zoom-in operation is again initiated by the user touching the screen for an extended period of time at two locations 41 and 42. However, in this case, locations 41 and 42 have approximately the same X coordinate. After a predetermined period of time has elapsed, the system assumes that the user is signaling a vertical zoom-in operation and expands the Y-axis scale as shown in FIG. 3B. A vertical zoom-out operation is performed in an analogous manner to that described above with respect to an X-axis zoom-in operation.

Figure 4A:
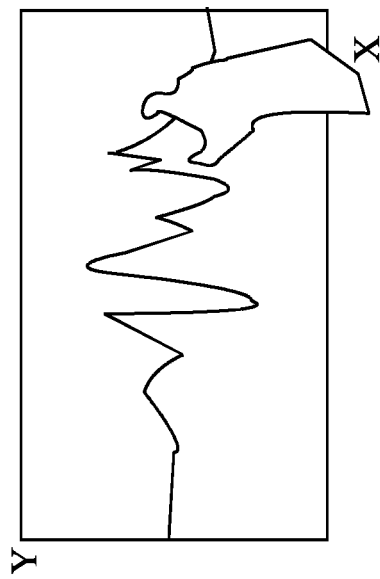
FIGS. 4A and 4B illustrate a simultaneous X and Y zoom-in operation.
Figure 4B:
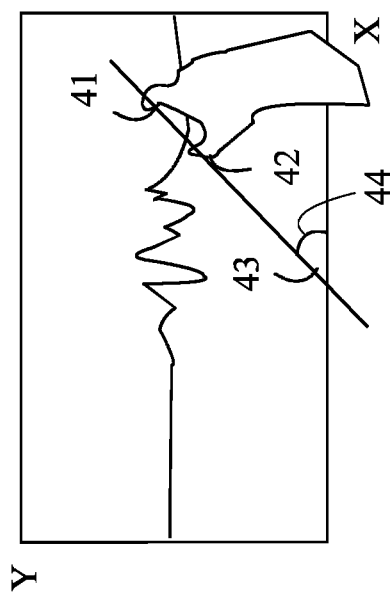

Similarly, both magnifications could be altered simultaneously by aligning the touch points on a slanted line. Refer now to FIGS. 4A and 4B, which illustrate a simultaneous X and Y zoom-in operation. In this case, the line 43 through the touch points shown at 41 and 42 is at an oblique angle 44 with respect to the X axis. As a result, both the X and Y magnifications are increased as shown in FIG. 4B. The ratio of the X and Y zooms can be set by angle 44 at a predetermined ratio when the angle is significantly different from 0 or 90 degrees to indicate a simultaneous zoom operation.

The present invention also includes a computer readable medium that stores instructions that cause a data processing system to execute the method of the present invention. A computer readable medium is defined to be any medium that constitutes patentable subject matter under 35 U.S.C. 101. Examples of such media include non-transitory media such as computer memory devices that store information in a format that is readable by a computer or data processing system.

The above-described embodiments of the present invention have been provided to illustrate various aspects of the invention. However, it is to be understood that different aspects of the present invention that are shown in different specific embodiments can be combined to provide other embodiments of the present invention. In addition, various modifications to the present invention will become apparent from the foregoing description and accompanying drawings. Accordingly, the present invention is to be limited solely by the scope of the following claims.

What is claimed is:

1. A method for controlling a screen in a data processing system to generate displays comprising portions of an underlying scene, said method comprising:
    displaying on said screen a first displayed scene comprising a first portion of said underlying scene, said first displayed scene being characterized by a first magnification and a first offset relative to said underlying scene;
    detecting a long touch gesture on said screen at a first location, said long touch gesture being characterized by a first time period, a first contact point on said screen, a second contact point on said screen, and a distance between said contact points; and
    displaying a second displayed scene on said screen, said second displayed scene comprising a different portion of said underlying scene and being characterized by a second magnification that is greater than said first magnification if said distance is greater than a predetermined value and less than said first magnification if said distance is less than said predetermined value, said second displayed scene being displayed in response to said long touch gesture, said predetermined value being set prior to said long touch gesture being detected, and said second magnification being set prior to said long touch being detected.

2. The method of claim 1 wherein said second magnification changes continuously as long as said long touch gesture is maintained for a time longer than a predetermined time.

3. The method of claim 1 wherein said second displayed scene is characterized by a second offset that is determined by said touch gesture.

4. The method of claim 3 wherein said second offset depends on said first displayed scene and said touch gesture.

5. The method of claim 1 further comprising displaying a third displayed scene on said screen after a second time period if said touch gesture is maintained for that second time period, said third displayed scene comprising a different portion of said underlying scene and being characterized by a third magnification and a third offset.

6. The method of claim 5 wherein said second time period is less than said first time period.

7. The method of claim 1 wherein said screen displays said first displayed scene when said touch gesture is terminated.

8. The method of claim 1 wherein said screen continues to display said second displayed screen when said touch gesture is terminated.

9. A non-transitory computer readable medium that stores instructions that cause a data processing system to execute a method that controls a screen in a data processing system to generate displays comprising portions of an underlying scene, said method comprising:
    displaying on said screen a first displayed scene comprising a first portion of said underlying scene, said first displayed scene being characterized by a first magnification and a first offset relative to said underlying scene;
    detecting a long touch gesture on said screen at a first location, said long touch gesture being characterized by a first time period, a first contact point on said screen, a second contact point on said screen, and a distance between said contact points; and displaying a second displayed scene on said screen, said second displayed scene comprising a different portion of said underlying scene and being characterized by a second magnification that is greater than said first magnification if said distance is greater than a predetermined value and less than said first magnification if said distance is less than said predetermined value, said second displayed scene being displayed in response to said long touch gesture, said predetermined value being set prior to said long touch gesture being detected, and said second magnification being set prior to said long touch being detected.

10. The non-transitory computer readable medium of claim 9 wherein said second magnification changes continuously as long as said long touch gesture is maintained for a time longer than a predetermined time.

11. The non-transitory computer readable medium of claim 9 wherein said second displayed scene is characterized by a second offset that is determined by said long touch gesture.

12. The non-transitory computer readable medium of claim 11 wherein said second offset depends on said first displayed scene and said long touch gesture.

13. The non-transitory computer readable medium of claim 9 further comprising displaying a third displayed scene on said screen after a second time period if said long touch gesture is maintained for that second time period, said third displayed scene comprising a different portion of said underlying scene and being characterized by a third magnification and a third offset.

14. The non-transitory computer readable medium of claim 13 wherein said second time period is less than said first time period.

15. The non-transitory computer readable medium of claim 9 wherein said screen displays said first displayed scene when said long touch gesture is terminated.

16. The non-transitory computer readable medium of claim 9 wherein said screen continues to display said second displayed screen when said long touch gesture is terminated.

* * * * *